(12) United States Patent
Vezzani

(10) Patent No.: US 11,602,157 B2
(45) Date of Patent: Mar. 14, 2023

(54) PROCESS FOR IMPROVING THE ORGANOLEPTIC AND NUTRITIONAL PROPERTIES OF LEGUME MEAL AND COMPONENTS AND DERIVATIVES THEREOF

(71) Applicant: Ambiente E Nutrizione S.R.L., Rozzano (IT)

(72) Inventor: Massimo Vezzani, Rozzano (IT)

(73) Assignee: VOMM IMPIANTI E PROCESSI S.P.A., Rozzano (IT)

( * ) Notice: Subject to any disclaimer, the term of this patent is extended or adjusted under 35 U.S.C. 154(b) by 116 days.

(21) Appl. No.: 15/546,733

(22) PCT Filed: Jan. 26, 2016

(86) PCT No.: PCT/EP2016/051502
§ 371 (c)(1),
(2) Date: Jul. 27, 2017

(87) PCT Pub. No.: WO2016/120234
PCT Pub. Date: Aug. 4, 2016

(65) Prior Publication Data
US 2018/0020705 A1     Jan. 25, 2018

(30) Foreign Application Priority Data
Jan. 29, 2015   (IT) .......................... MI2015A000121

(51) Int. Cl.
*A23L 11/30*    (2016.01)
*A23P 10/40*    (2016.01)
(Continued)

(52) U.S. Cl.
CPC ............ *A23L 11/31* (2016.08); *A23B 7/0205* (2013.01); *A23B 7/028* (2013.01); *A23B 9/025* (2013.01);
(Continued)

(58) Field of Classification Search
CPC ... A23L 3/16; A23L 3/165; A23L 3/18; A23L 3/185; A23L 3/48; A23L 11/30;
(Continued)

(56) References Cited

U.S. PATENT DOCUMENTS 1,813,268 A * 7/1931 Bachler .................. A23L 11/05
426/634
2,026,676 A * 1/1936 Lowell .................... A23L 11/31
426/431
(Continued)

FOREIGN PATENT DOCUMENTS

CN     103263066 A    8/2013
CN     103829040 A    6/2014
(Continued)

OTHER PUBLICATIONS

International Search Report of PCT/EP2016/051502 dated Mar. 22, 2016.

*Primary Examiner* — Erik Kashnikow
*Assistant Examiner* — Bryan Kim
(74) *Attorney, Agent, or Firm* — Silvia Salvadori, P.C.; Silvia Salvadori

(57) ABSTRACT

Process for the production legume meal having a moisture content between 2% and 15%. The process includes feeding a continuous flow of legume meal into a wet heat treatment reactor together with a continuous flow of water or aqueous solution, which is dispersed into minute droplets; discharge the wet legume meal and feeding it into a thermal dehydration and treatment reactor.

13 Claims, 1 Drawing Sheet

(51) Int. Cl.
*A23L 5/20* (2016.01)
*A23B 7/028* (2006.01)
*A23B 9/02* (2006.01)
*A23B 9/08* (2006.01)
*A23B 7/02* (2006.01)

(52) U.S. Cl.
CPC ............... *A23B 9/08* (2013.01); *A23L 5/21* (2016.08); *A23P 10/40* (2016.08); *A23V 2002/00* (2013.01)

(58) Field of Classification Search
CPC . A23L 11/31; A23L 3/001; A23L 3/22; A23L 3/225; A23L 5/05; A23L 5/07; A23L 5/30; A23L 5/31; A23L 5/32; A23L 11/05; A23L 11/07; A23L 11/32; A23P 10/40; A23P 10/43; A23P 10/47; A23J 1/14; A23J 1/142; A23J 1/144; A23J 3/16; A23B 7/005; A23B 7/0053; A23B 7/0205; A23B 7/028
USPC ....... 426/622, 623, 629, 630, 634, 635, 640, 426/455–457, 460, 461, 463, 506, 507, 426/508, 511, 520, 521, 523
See application file for complete search history.

(56) References Cited

U.S. PATENT DOCUMENTS

| | | | | |
|---|---|---|---|---|
| 2,260,254 A * | 10/1941 | Kruse | ............... | A23L 11/31 426/459 |
| 2,278,484 A * | 4/1942 | Plews | ............... | A23P 30/32 426/634 |
| 2,585,793 A * | 2/1952 | Kruse | ............... | A23L 11/31 426/431 |
| 3,133,818 A * | 5/1964 | Gould | ............... | A23L 7/198 426/463 |
| 3,168,406 A * | 2/1965 | Moshy | ............... | A23L 11/32 426/254 |
| 3,253,930 A * | 5/1966 | Maxr | ............... | A23K 40/00 426/457 |
| 4,022,919 A * | 5/1977 | Comer | ............... | A23L 11/31 426/511 |
| 4,035,194 A * | 7/1977 | Grassi | ............... | A23J 1/14 106/125.1 |
| 4,076,851 A * | 2/1978 | Tunoda | ............... | A23L 11/07 241/11 |
| 4,205,094 A * | 5/1980 | Baird | ............... | A23J 3/22 426/459 |
| 4,853,248 A * | 8/1989 | Wursch | ............... | A23L 11/05 426/634 |
| 5,936,069 A * | 8/1999 | Johnson | ............... | A23J 1/14 426/44 |
| 5,980,971 A * | 11/1999 | Walsh | ............... | A23L 11/10 426/459 |
| 6,465,037 B1 * | 10/2002 | Altemueller | ............... | A23J 3/16 426/634 |
| 6,589,589 B2 * | 7/2003 | Whalen | ............... | A23C 11/103 426/511 |
| 7,811,617 B1 * | 10/2010 | Wenger | ............... | A23K 40/20 426/233 |
| 8,093,023 B1 * | 1/2012 | Prevost | ............... | A23J 1/14 435/161 |
| 8,623,445 B2 * | 1/2014 | Tang | ............... | A23J 1/14 426/656 |
| 2014/0010940 A1 * | 1/2014 | Green | ............... | A23J 1/14 426/580 |

FOREIGN PATENT DOCUMENTS

| | | |
|---|---|---|
| CN | 104000167 A | 8/2014 |
| EP | 2386207 A1 | 11/2011 |
| EP | 2620462 A1 | 7/2013 |

* cited by examiner

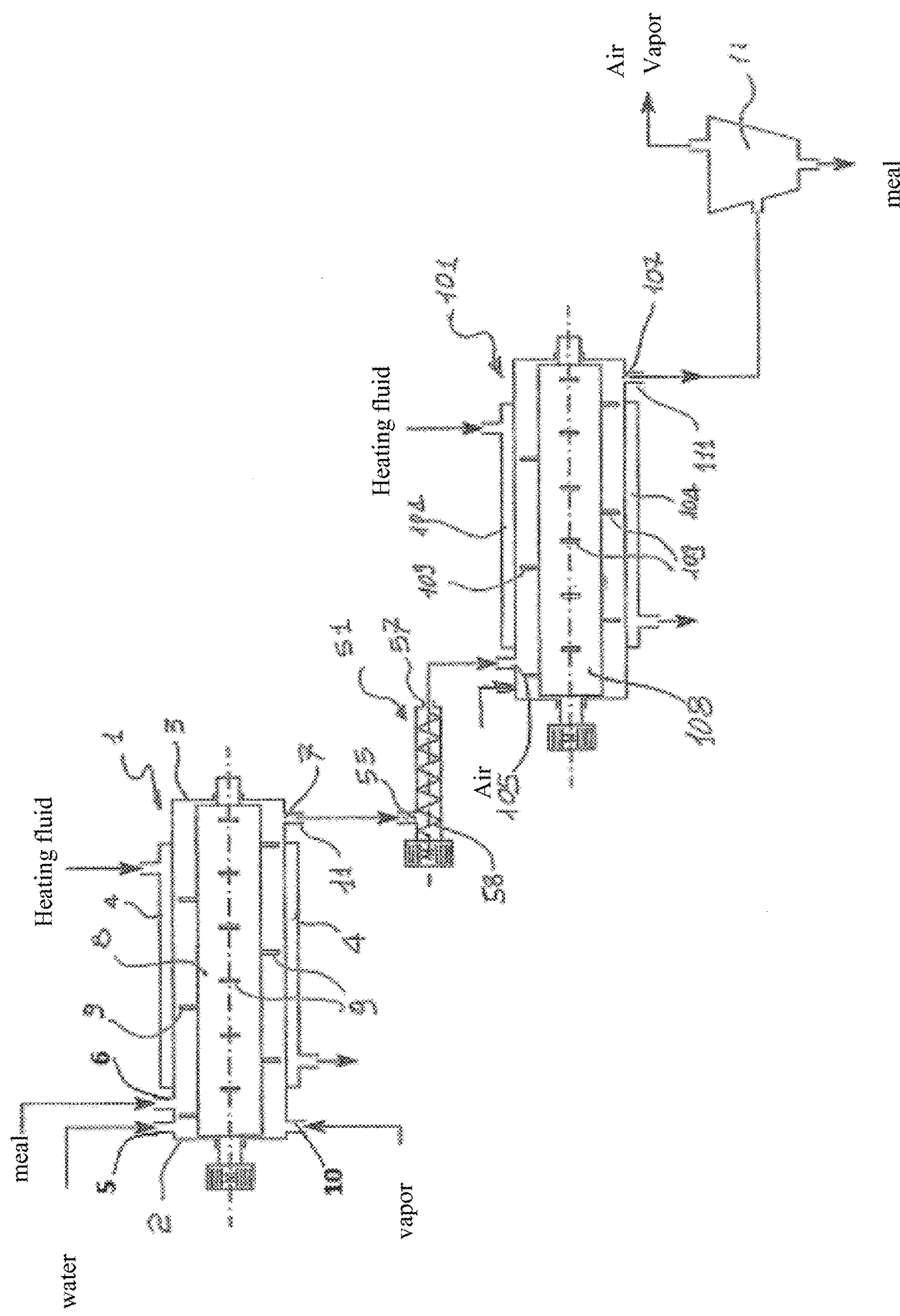

PROCESS FOR IMPROVING THE ORGANOLEPTIC AND NUTRITIONAL PROPERTIES OF LEGUME MEAL AND COMPONENTS AND DERIVATIVES THEREOF This application is a U.S. national stage of PCT/EP206/051502 filed on 26 Jan. 2016, which claims priority to and the benefit of Italian Patent Application No. MI2015A000121 filed on 29 Jan. 2015, the contents of which are all incorporated herein by reference in their entireties.

FIELD OF APPLICATION

The present invention relates to the sector of the food and dietary industry and in particular relates to a process for the production of legume meal with improved organoleptic and nutritional properties.

PRIOR ART

Legumes have always constituted an important source of nutritional substances since they contain, in relation to their dry weight, about 17-25% by weight of proteins and about 58-68% by weight of carbohydrates, mainly complex, as well as water-soluble vitamins, potassium, magnesium, dietary fibers and natural oxidants.

The high carbohydrate content gives the legumes a high energetic power.

Except for soya, legumes are low in fats and particularly recommended in hypolipidic diets. The high fiber content makes them a satiating food and helps prevent conditions such as slight dyslipidemia, diverticulosis of the colon, constipation, overweight or other pathological conditions, such as coronary heart disease, arteriosclerosis, diabetes, obesity, malignant tumors of the large intestine and bilestones.

Legumes are among the vegetable foodstuffs which are richest in calcium.

Legumes are "plastic" foods with a protein content comparable to that of meat even though the biological value is overall less, because the proteins of legumes do not contain all the essential amino acids.

Although of vegetable origin, these proteins provide a number of essential amino acids, such as lysine, threonine, valine and tryptophan, in a reasonable amount, greater than that present in the proteins of wheat, corn and rice. The latter, moreover, contain large amounts of sulfurated amino acids, which are instead present only in small amounts in legumes. The association of cereals or their derivatives with legumes is therefore extremely functional and may provide the organism with a protein mixture, the biological value of which is comparable to that of animal proteins.

The content of magnesium, potassium, calcium and iron is undoubtedly high, but part of the minerals are neutralized by the abundant presence of phytates, i.e. "anti-nutritional" substances which reduce the absorption thereof.

Moreover some legumes, in particular beans, contain lectins, in particular phytohemagglutinin, which may increase the intestinal permeability and cause inflammation and lead to immunitary diseases.

Other undesirable substances contained in legumes are cyanogenic glucosides, capable of releasing hydrocyanic acid into the intestine, if they are not suitably deactivated by means of cooking.

Legumes contain moreover protease inhibitors, which hinder the digestives processes in the intestine and reduce the bioavailability of the proteins contained in legumes.

Moreover, legumes, and in particular fava beans, contain glycoproteins with a low molecular weight which are absorbed without being digested and behave in the manner of allergens, causing an immunitary action affecting the skin or the respiratory system.

Despite the aforementioned drawbacks, nutritionists for some time have been recommending a greater consumption of legumes, in particular in association with cereals, in place of meat-based food, in order to prevent cardiovascular and tumor diseases.

Legumes are commercially available in the form of dry seeds intended to be boiled after, where necessary, being soaked in water at room temperature for several hours, or in the form of meal intended for the preparation of various traditional dishes, such as "farinata" (chickpeas cake), "panelle" (chickpea fritters) or "cecina" (chickpea flan) or for mixing with cereal flours in order to produce mixes from which bakery products or pasta may be made.

Also commercially available are isolated proteins obtained from legumes, as well as legume fibers, in the form of meal.

The aforementioned meal products moreover often have a taste which is characterized by a certain bitterness, which is generally not liked and greatly limits their consumption.

The problem underlying the present invention is that of providing novel legume meal which has improved organoleptic and nutritional properties, in particular without the aforementioned drawbacks or having these drawbacks to lesser degree compared to known meal products.

SUMMARY OF THE INVENTION

Such a problem has been solved by a process for the production of legume meal comprising the steps of:

a) providing a wet heat treatment reactor comprising a cylindrical tubular body with horizontal axis, having at least one opening for the introduction of legume meal and water or an aqueous solution and having at least one discharge opening, a heating jacket for raising the temperature of said tubular body to a temperature of at least 80° C., and a rotor arranged inside the cylindrical tubular body and comprising a shaft provided with elements projecting radially therefrom;

b) feeding a continuous flow of said meal into said reactor, in which the rotor is rotated at a speed greater than or equal to 150 rpm;

c) feeding into said reactor, together with said flow of meal, a continuous flow of water or aqueous solution, which is dispersed into minute droplets;

d) centrifuging said flows against the inner wall of the reactor, thus forming a highly turbulent, dynamic, thin tubular fluid layer, in which the meal particles and the droplets of water or aqueous solution are kept mechanically in intimate contact by the radially projecting elements of said rotor, while advancing in substantial contact with said inner wall of the reactor towards the discharge opening;

e) discharging from the discharge opening a continuous flow of wet meal (moisture content 20-40%);

f) providing a thermal dehydration and treatment reactor, comprising a cylindrical tubular body with horizontal axis, having at least one inlet opening and at least one discharge opening, a heating jacket for raising the temperature of said tubular body to a predetermined temperature, and a rotor arranged inside the cylindrical tubular body and comprising a shaft provided with elements projecting radially therefrom;

g) feeding said wet meal into said reactor through the at least one inlet opening, the inner wall of the reactor being kept at a temperature of at least 100° C. by means of said heating jacket and the rotor being rotated at a speed of at least 150 rpm;

h) centrifuging and causing said wet meal to advance inside the reactor by means of the action of said rotor;

i) discharging from the discharge opening of the reactor a continuous flow of legume meal having a moisture content of between 2% and 15%.

Preferably, during step c), a continuous flow of water vapor is fed, through the aforementioned at least one opening, into the wet heat treatment reactor.

Preferably, at the same time as feeding of the aforementioned flow of wet meal into the thermal dehydration and treatment reactor according to step g), a flow of gas, preferably air, heated to a temperature of at least 100° C., is also fed into this reactor, through the aforementioned at least one inlet opening.

The aforementioned aqueous solution may contain one or more water-soluble ingredients, selected from the group comprising salts, in particular sodium chloride, flavorings, water-soluble vitamins, in particular ascorbic acid, and natural antioxidants.

The temperature of the inner wall of the wet heat treatment reactor is preferably kept at 100-250° C., conveniently at 150-190° C.

The rotational speed of the rotor of the wet heat treatment reactor is preferably set to 500-3000 rpm.

The temperature of the inner wall of the thermal dehydration and treatment reactor is preferably kept at 120-280° C., conveniently at 150-190° C.

The rotational speed of the rotor of the thermal dehydration and treatment reactor is preferably set to 300-1200 rpm.

The temperature of the gas flow into the thermal dehydration and treatment reactor is preferably comprised between 120° C. and 250° C., conveniently between 140° C. and 190° C.

The water or aqueous solution fed into the wet heat treatment reactor has preferably a temperature of 30-110° C., conveniently 70-90° C.

The ratio between the flow rate of water or aqueous solution fed into the wet heat treatment reactor and the flow rate of legume meal fed into the wet heat treatment reactor is preferably between 1:10 and 1:2, conveniently between 1:4 and 1:2.5.

The aforementioned elements radially projecting from the rotor shaft may be for example in the form of rods or blades or V-blades or beaters.

The term "legume meal" is understood as meaning a finely divided product obtained from the grinding of legumes, which may be in the form of flour, semolina or fine granules, but it is also understood as meaning isolated proteins of legumes and legume fibers in the form of flour, semolina or fine granules.

The term "legumes" is understood as meaning vegetable products of different kinds and varieties, which comprise among other things beans (*Phaseolus vulgaris* L.), peas (*Pisum sativum* L.), chickpeas (*Cicer arietinum* L.), fava beans (*Vicia faba* L.), lentils (*Lens culinaris* L.), lupins (*Lupinus*), grass peas (*Lathyrus sativus*) and soybean (*Glycine max* L Merr.).

The legume meal products treated with the process according to the present invention have organoleptic properties (in particular smell and taste) which are markedly improved compared to the starting meal products, probably, among other things, due to the Maillard reaction which occurs between the proteins and the carbohydrates contained in the meal and which is favored by heating this meal in the presence of water at temperatures suitable for promoting the Maillard reaction. As a result of this reaction, the taste of the meal is greatly improved, in particular owing to the substantial elimination of the bitter aftertaste typical of legume meal products. Moreover, it has been established that the heat treatment in turbulent and dynamic thin-layer conditions, which occurs in the process according to the present invention, results in the total deactivation of the cyanogenic glucosides and the lectins.

It has also been established that the treatment to which the legume meal is subjected in the process according to the present invention, in particular during the steps carried out inside the turbo-cooker, results in hydrolysis of the glycoproteins with a low molecular weight and therefore avoids the immunity-system problems arising from the presence of these substances.

Finally, the process according to the present invention results in inactivation of the phytases and allows fixing of the phytins (Ca and Mg glucophosphatides) on the amino acids of the proteins.

The present invention further relates to a plant for carrying out the process described above, which comprises:

a wet heat treatment reactor comprising a cylindrical tubular body with horizontal axis, having at least one opening for the introduction of legume meal and water or an aqueous solution and having at least one discharge opening, a heating jacket, and a rotor arranged inside the cylindrical tubular body and comprising a shaft provided with elements projecting radially therefrom; and a thermal dehydration and treatment reactor, comprising a cylindrical tubular body with horizontal axis, having at least one inlet opening and at least one discharge opening, a heating jacket for raising the temperature of the aforementioned tubular body to a predetermined temperature and a rotor arranged inside the cylindrical tubular body and comprising a shaft provided with elements projecting radially therefrom.

Preferably, the aforementioned elements radially projecting from the shaft of the rotor of the aforementioned wet heat treatment reactor, as well as the aforementioned elements radially projecting from the shaft of the rotor of the aforementioned thermal dehydration and treatment reactor, are chosen from the group comprising rods, blades, V-blades and beaters.

In one embodiment thereof, the plant according to the present invention further comprises an injector device having a body of tubular shape, provided with an inlet opening for the wet meal exiting from the aforementioned wet heat treatment reactor and an outlet opening, a bladed or screw rotor being rotatably supported in the tubular body, which rotor imparts to the wet meal an advancing thrust towards the outlet opening.

BRIEF DESCRIPTION OF THE DRAWINGS

Further features and advantages of the present invention will emerge more clearly from the following detailed description provided with reference to the sole attached FIGURE (FIG. 1), which shows in schematic form an embodiment of a plant for carrying out the process according to the present invention.

DETAILED DESCRIPTION OF THE INVENTION

With reference to the aforementioned FIGURE, an apparatus used for the process according to the present invention comprises a wet heat treatment reactor consisting essentially of a cylindrical tubular body 1, closed at the opposite ends by end plates 2, 3 and coaxially provided with a heating/cooling jacket intended to be passed through by a fluid, for example diathermic oil, so as to keep the inner wall of the body 1 at a predefined temperature.

The tubular body 1 is provided with inlet openings 5, 6 and 10, i.e. 5 for the water or aqueous solution, 6 for the legume meal and 10 for the vapor, and with a discharge opening 7.

The tubular body 1 rotatably supports internally a rotor 8 comprising a shaft 8 provided with elements radially projecting therefrom in the form of blades 9 which are arranged helically and oriented so as to centrifuge and at the same time convey towards the outlet the flows of meal and water or aqueous solution.

A motor M is envisaged for operation of the rotor at variable speeds ranging from 150 to 3000 rpm.

When it exits from the reactor, the wet meal is fed via a pipe 11, communicating with the discharge opening 7 of the wet heat treatment reactor, to the injector device 51.

The body of the injector device 51 has a tubular shape and is provided with an inlet opening 55 which receives the wet meal from the pipe 11, and an outlet opening 57.

The tubular body 51 rotatably supports internally a bladed or screw rotor 58 which imparts to the wet meal an advancing thrust towards the outlet opening 57 so as to convey the wet meal to the inlet opening 105 of a thermal dehydration and treatment reactor 101. This reactor 101, which has a structure entirely similar to the wet treatment reactor mentioned further above, is not described in detail. The components of the thermal dehydration and treatment reactor which are identical to those of the wet heat treatment reactor are indicated by the same reference numbers increased by 100.

The dried meal output from the thermal dehydration and treatment reactor is conveyed to a receiving container 18 which separates said meal from the steam and air also exiting from this reactor.

EXAMPLE 1

A flow of yellow pea meal (80 kg/h) with a moisture content of 14.4% was continuously fed, through the opening 6, into the wet heat treatment reactor 1, inside which the bladed rotor 8 was rotated at a speed of 700 rpm. At the same time a flow of water at 80° C. (20 kg/h) was continuously fed through the opening 5, and a flow of steam was continuously fed through the opening 10 at 105° C. (15 kg/h).

Immediately at the inlet of the reactor 1, the flow of meal was mechanically dispersed into particles which were immediately centrifuged against the inner wall of the wet heat treatment reactor, where a thin, fluid, tubular and dynamic layer was formed. At the same time, the water fed through the opening 5 was finely atomized by the blades of the rotor 8 which also performed the immediate centrifuging of the very fine droplets obtained. These droplets were thus introduced into the thin, fluid, tubular and dynamic layer of meal particles, with which they were able to interact intimately, in the presence also of the steam fed through the opening 10. The rotational speed of the bladed rotor 8 was equal to 700 rpm.

After an average residence time of about 30 seconds inside the reactor, a thermally treated wet meal was continuously discharged from the opening 7. The wet meal in question had a moisture content of 25.3%.

This wet meal was continuously fed into the thermal dehydration and treatment reactor 101, via the injector 51, at a flow rate of 80 kg/h, in co-current with an air flow at a temperature of 180° C. (flow rate 385 m$^3$/h).

Inside the reactor 101, the wall temperature was kept at a value of 180° C., while the rotational speed of the bladed rotor 108 was kept constantly at 1000 rpm.

After an average residence time of 20 seconds inside the reactor, a meal with a moisture content of 10% was continuously discharged therefrom.

EXAMPLE 2

Using the same apparatus as that used in Example 1, the process according to the present invention was carried using isolated pea proteins in powder form having a moisture content of 10.2%, following the same steps described in Example 1.

The flow of isolated pea proteins in powder form was equal to 80 kg/h; the water flow at 80° C. was equal to 20 kg/h, the flow of steam was equal to 15 kg/h and the rotational speed of the bladed rotor 8 was equal to 750 rpm.

The average residence time inside the wet treatment reactor was about 30 seconds. The wet meal consisting of isolated pea proteins output from this reactor had a moisture content of 26.9%.

The flow of wet meal of isolated pea proteins fed into the thermal dehydration and treatment reactor was equal to 80 kg/h; the air flow fed into the thermal dehydration and treatment reactor had a temperature of 178° C. and a flow rate of 390 m$^3$/h, while the wall temperature was kept at a value of 180° C. and the rotational speed of the bladed rotor 108 was 1000 rpm.

The average residence time inside the thermal dehydration and treatment reactor was about 20 seconds. The wet meal consisting of isolated pea proteins output from this reactor had a moisture content of 9.8%.

EXAMPLE 3

Using the same apparatus as that used in Example 1, the process according to the present invention was carried using fava bean flour having a moisture content of 10.2%, following the same steps described in Example 1.

The flow of fava bean flour was equal to 90 kg/h; the water flow at 80° C. was equal to 32 kg/h, the flow of steam was equal to 15 kg/h and the rotational speed of the bladed rotor 8 was equal to 900 rpm.

The average residence time inside the wet treatment reactor was about 30 seconds. The wet fava bean flour output from this reactor had a moisture content of 27.8%.

The flow of wet fava bean fed into the thermal dehydration and treatment reactor was equal to 80 kg/h; the air flow fed into the thermal dehydration and treatment reactor had a temperature of 180° C. and a flow rate of 400 m$^3$/h, while the wall temperature was kept at a value of 180° C. and the rotational speed of the bladed rotor 108 was 650 rpm.

The average residence time inside the thermal dehydration and treatment reactor was about 20 seconds. The fava bean flour output from this reactor had a moisture content of 12.4%.

EXAMPLE 4

Using the same apparatus as that used in Example 1, the process according to the present invention was carried using isolated lentil proteins in powder form having a moisture content of 11.8%, following the same steps described in Example 1.

The flow of isolated lentil proteins in powder form was equal to 90 kg/h; the water flow at 80° C. was equal to 32 kg/h, the flow of steam was equal to 15 kg/h and the rotational speed of the bladed rotor 8 was equal to 900 rpm.

The average residence time inside the wet treatment reactor was about 30 seconds. The wet isolated lentil protein in powder form output from this reactor had a moisture content of 27.8%.

The flow of isolated lentil proteins in powder form fed into the thermal dehydration and treatment reactor was equal to 80 kg/h; the air flow fed into the thermal dehydration and treatment reactor had a temperature of 170° C. and a flow rate of 400 m³/h, while the wall temperature was kept at a value of 180° C. and the rotational speed of the bladed rotor 108 was 650 rpm.

The average residence time inside the thermal dehydration and treatment reactor was about 20 seconds. The isolated lentil proteins in powder form output from this reactor had a moisture content of 10.9%.

EXAMPLE 5

Using the same apparatus as that used in Example 1, the process according to the present invention was carried using isolated fava bean proteins in powder form having a moisture content of 11.3%, following the same steps described in Example 1.

The flow of isolated fava bean proteins in powder form was equal to 80 kg/h; the water flow at 85° C. was equal to 20 kg/h, the flow of steam was equal to 15 kg/h and the rotational speed of the bladed rotor 8 was equal to 700 rpm.

The average residence time inside the wet treatment reactor was about 30 seconds. The wet powder of isolated fava bean proteins output from this reactor had a moisture content of 25.9%.

The flow of isolated fava bean proteins in powder form fed into the thermal dehydration and treatment reactor was equal to 80 kg/h; the air flow fed into the thermal dehydration and treatment reactor had a temperature of 180° C. and a flow rate of 390 m³/h, while the wall temperature was kept at a value of 180° C. and the rotational speed of the bladed rotor 108 was 1000 rpm.

The average residence time inside the thermal dehydration and treatment reactor was about 20 seconds. The isolated fava bean proteins in powder form output from this reactor had a moisture content of 11.4%.

The invention claimed is:

1. A process for the production of legume meal, said process consisting comprising the steps of:
a) providing a wet heat treatment reactor comprising a cylindrical tubular body with an inner wall and with horizontal axis, having at least one opening for the introduction of a legume meal and water or an aqueous solution and having at least one discharge opening, a heating jacket for raising the temperature of said tubular body to a predetermined temperature, and a rotor arranged inside the cylindrical tubular body and comprising a shaft provided with elements projecting radially therefrom;
b) feeding a continuous flow of said meal into said reactor, in which the rotor is rotated at a speed greater than or equal to 150 rpm;
c) feeding into said reactor, together with said flow of meal, a continuous flow of said water or aqueous solution, wherein said water or aqueous solution has a temperature of 70°-90° C. and is dispersed into droplets;
d) centrifuging said flows against the inner wall of the cylindrical tubular body of the reactor, thus forming a turbulent, dynamic, tubular fluid layer, in which the meal particles and the droplets of water or aqueous solution are kept mechanically in contact by the radially projecting elements of said shaft, while advancing in substantial contact with said inner wall of the reactor toward the discharge opening;
e) discharging from the discharge opening a continuous flow of a wet meal having a moisture content of 20-40%;
f) providing a thermal dehydration and treatment reactor, comprising a cylindrical tubular body with an inner wall and with horizontal axis, having at least one inlet opening and at least one discharge opening, a heating jacket for raising the temperature of said tubular body to a predetermined temperature, and a rotor arranged inside the cylindrical tubular body and comprising a shaft provided with elements projecting radially from said shaft;
g) feeding said wet meal into said thermal dehydration and treatment reactor through the at least one inlet opening, the inner wall of the thermal dehydration and treatment reactor being kept at a temperature of at least 100° C. by means of said heating jacket and the rotor being rotated at a speed of at least 150 rpm;
h) centrifuging and causing said wet meal to advance inside the thermal dehydration and treatment reactor by the action of said rotor;
i) discharging from the discharge opening of the thermal dehydration and treatment reactor a continuous flow of legume meal having a moisture content of between 2% and 15%.

2. A process for the production of legume meal, said process consisting of:
a) providing a wet heat treatment reactor comprising a cylindrical tubular body with an inner wall and with horizontal axis, having at least one opening for the introduction of a legume meal and water or an aqueous solution and having at least one discharge opening, a heating jacket for raising the temperature of said tubular body to a predetermined temperature, and a rotor arranged inside the cylindrical tubular body and comprising a shaft provided with elements projecting radially therefrom;
b) feeding a continuous flow of said meal into said reactor, in which the rotor is rotated at a speed greater than or equal to 150 rpm;
c) feeding into said reactor, together with said flow of meal, a continuous flow of said water or aqueous solution, wherein said water or aqueous solution has a temperature of 70°-90° C. and is dispersed into droplets, and feeding a continuous flow of steam into the wet heat treatment reactor through said at least one opening;
d) centrifuging said flows against the inner wall of the cylindrical tubular body of the reactor, thus forming a turbulent, dynamic, tubular fluid layer, in which the meal particles and the droplets of water or aqueous solution are kept mechanically in contact by the radially projecting elements of said shaft, while advancing in substantial contact with said inner wall of the reactor toward the discharge opening;

e) discharging from the discharge opening a continuous flow of a wet meal having a moisture content of 20-40%;

f) providing a thermal dehydration and treatment reactor, comprising a cylindrical tubular body with an inner wall and with horizontal axis, having at least one inlet opening and at least one discharge opening, a heating jacket for raising the temperature of said tubular body to a predetermined temperature, and a rotor arranged inside the cylindrical tubular body and comprising a shaft provided with elements projecting radially from said shaft;

g) feeding said wet meal into said thermal dehydration and treatment reactor through the at least one inlet opening, the inner wall of the thermal dehydration and treatment reactor being kept at a temperature of at least 100° C. by means of said heating jacket and the rotor being rotated at a speed of at least 150 rpm;

h) centrifuging and causing said wet meal to advance inside the thermal dehydration and treatment reactor by the action of said rotor;

i) discharging from the discharge opening of the thermal dehydration and treatment reactor a continuous flow of legume meal having a moisture content of between 2% and 15%.

3. A process for the production of legume meal, said process consisting of:

a) providing a wet heat treatment reactor comprising a cylindrical tubular body with an inner wall and with horizontal axis, having at least one opening for the introduction of a legume meal and water or an aqueous solution and having at least one discharge opening, a heating jacket for raising the temperature of said tubular body to a predetermined temperature, and a rotor arranged inside the cylindrical tubular body and comprising a shaft provided with elements projecting radially therefrom;

b) feeding a continuous flow of said meal into said reactor, in which the rotor is rotated at a speed greater than or equal to 150 rpm;

c) feeding into said reactor, together with said flow of meal, a continuous flow of said water or aqueous solution, wherein said water or aqueous solution has a temperature of 70°-90° C. and is dispersed into droplets;

d) centrifuging said flows against the inner wall of the cylindrical tubular body of the reactor, thus forming a turbulent, dynamic, tubular fluid layer, in which the meal particles and the droplets of water or aqueous solution are kept mechanically in contact by the radially projecting elements of said shaft, while advancing in substantial contact with said inner wall of the reactor toward the discharge opening;

e) discharging from the discharge opening a continuous flow of a wet meal having a moisture content of 20-40%;

f) providing a thermal dehydration and treatment reactor, comprising a cylindrical tubular body with an inner wall and with horizontal axis, having at least one inlet opening and at least one discharge opening, a heating jacket for raising the temperature of said tubular body to a predetermined temperature, and a rotor arranged inside the cylindrical tubular body and comprising a shaft provided with elements projecting radially from said shaft;

g) feeding said wet meal into said thermal dehydration and treatment reactor through the at least one inlet opening, the inner wall of the thermal dehydration and treatment reactor being kept at a temperature of at least 100° C. by means of said heating jacket and the rotor being rotated at a speed of at least 150 rpm, wherein a flow of a gas heated to a temperature of at least 100° C. is fed into the thermal dehydration and treatment reactor through said at least one inlet opening;

h) centrifuging and causing said wet meal to advance inside the thermal dehydration and treatment reactor by the action of said rotor;

i) discharging from the discharge opening of the thermal dehydration and treatment reactor a continuous flow of legume meal having a moisture content of between 2% and 15%.

4. The process according to claim 1, wherein the temperature of the inner wall of said wet heat treatment reactor is kept at 100-250° C.

5. The process according to claim 1, wherein the rotational speed of the rotor of the wet heat treatment reactor is equal to 500-3000 rpm.

6. The process according to claim 1, wherein the temperature of the inner wall of the thermal dehydration and treatment reactor is kept at 120-280° C.

7. The process according to claim 1, wherein the rotational speed of the rotor of the thermal dehydration and treatment reactor is equal to 300-1200 rpm.

8. The process according to claim 3, wherein the temperature of the gas flow fed into the thermal treatment and dehydration reactor is between 120° C. and 250° C., and said gas is air.

9. The process according to claim 2, wherein the steam has a temperature of 105° C.

10. The process according to claim 1, wherein a ratio between a flow rate of the water or aqueous solution fed into the wet heat treatment reactor and a flow rate of legume meal fed into the wet heat treatment reactor is between 1:10 and 1:2.

11. The process according to claim 1, wherein a ratio between a flow rate of the water or aqueous solution fed into the wet heat treatment reactor and a flow rate of legume meal fed into the wet heat treatment reactor is between 1:4 and 1:2.5.

12. The process according to claim 1, wherein said meal is obtained from legumes selected from the group consisting of beans (*Phaseolus vulgaris* L.), peas (*Pisum sativum* L.), chickpeas (*Cicer arietinum* L.), fava beans (*Vicia faba* L.), lentils (*Lens culinaris* L.), lupins (*Lupinus*), grass peas (*Lathyrus sativus*) and soybean (*Glycine max* L. Merr.).

13. The process according to claim 1, wherein said aqueous solution contains one or more water-soluble compounds, selected from the group consisting of salts, flavorings, water-soluble vitamins and antioxidants.

* * * * *